(12) United States Patent
Fardanov et al.

(10) Patent No.: US 12,281,226 B2
(45) Date of Patent: Apr. 22, 2025

(54) POLYVINYL CHLORIDE-FREE LIPOPHILIC POLYMER BASED AROMATIZED PLASTISOL

(71) Applicants: Aleksandra Fardanov, Irvine, CA (US); Oleg Fardanov, Irvine, CA (US); Dmitry Zadorin, Batumi (GE)

(72) Inventors: Aleksandra Fardanov, Irvine, CA (US); Oleg Fardanov, Irvine, CA (US); Dmitry Zadorin, Batumi (GE)

(73) Assignee: Organo Plastica, Costa Mesa, CA (US)

( * ) Notice: Subject to any disclaimer, the term of this patent is extended or adjusted under 35 U.S.C. 154(b) by 452 days.

(21) Appl. No.: 17/281,201

(22) PCT Filed: Oct. 3, 2019

(86) PCT No.: PCT/US2019/054562
§ 371 (c)(1),
(2) Date: Mar. 29, 2021

(87) PCT Pub. No.: WO2020/072817
PCT Pub. Date: Apr. 9, 2020

(65) Prior Publication Data
US 2021/0395515 A1    Dec. 23, 2021

Related U.S. Application Data

(60) Provisional application No. 62/741,425, filed on Oct. 4, 2018.

(51) Int. Cl.
*C08L 67/04*    (2006.01)
*C08G 63/08*    (2006.01)
(Continued)

(52) U.S. Cl.
CPC ............. *C08L 67/04* (2013.01); *C08G 63/08* (2013.01); *C08K 13/02* (2013.01);
(Continued)

(58) Field of Classification Search
None
See application file for complete search history.

(56) References Cited

U.S. PATENT DOCUMENTS 3,632,669 A * 1/1972 Lundberg et al. ...... C08L 67/04
524/505
3,775,227 A * 11/1973 Wilbert ................. A61L 9/01
428/21
(Continued)

FOREIGN PATENT DOCUMENTS

CA    3032582 A1 *   2/2018
CN    101056943      10/2007
(Continued)

OTHER PUBLICATIONS

A 14-page brochure for Lemon Essential Oil, downloaded on Jul. 7, 2023.*
(Continued)

*Primary Examiner* — Tae H Yoon
(74) *Attorney, Agent, or Firm* — Fish IP Law, LLP

(57) ABSTRACT

Polymer compositions suitable for modeling are provided as plastisols with a high content of volatile substances, such as bactericidal, aromatizing, and/or flavoring volatiles. Such plastisols are provided by mixing a lyophilic polyamide or lyophilic complex polyester with a plasticizer of moderate to low polarity that includes a bactericidal, aromatizing, and/or flavoring components, such as an essential oil. After mixing, additives such as fillers, pigments, and gelling agents are added. A solid plastic is producing by heating the formed plastisol to a gelation temperature and then heating to a solution temperature to generate a solid plastic with enduring bactericidal activity, scent, and/or flavor.

10 Claims, 2 Drawing Sheets

(51) Int. Cl.
*C08K 13/02* (2006.01)
*C08L 23/08* (2006.01)
*C08L 23/0853* (2025.01)
*C08L 31/04* (2006.01)
*C08L 77/00* (2006.01)
*C08K 3/36* (2006.01)
*C08K 5/01* (2006.01)
*C08K 5/05* (2006.01)
*C08K 5/07* (2006.01)
*C08K 5/101* (2006.01)
*C08K 5/13* (2006.01)

(52) U.S. Cl.
CPC ........... *C08L 23/0853* (2013.01); *C08L 31/04* (2013.01); *C08L 77/00* (2013.01); *C08K 3/36* (2013.01); *C08K 5/01* (2013.01); *C08K 5/05* (2013.01); *C08K 5/07* (2013.01); *C08K 5/101* (2013.01); *C08K 5/13* (2013.01); *C08L 2205/03* (2013.01); *C08L 2205/16* (2013.01)

(56) References Cited

U.S. PATENT DOCUMENTS

| | | | | |
|---|---|---|---|---|
| 3,926,655 A | * | 12/1975 | Miles | A61Q 13/00 106/270 |
| 4,184,099 A | * | 1/1980 | Lindauer | A61L 9/03 106/243 |
| 4,540,721 A | * | 9/1985 | Staller | A61L 9/042 252/186.1 |
| 4,552,693 A | * | 11/1985 | Hussain | A61L 9/042 512/4 |
| 4,734,278 A | * | 3/1988 | Pougalan | A01N 25/18 424/84 |
| 5,756,561 A | | 5/1998 | Wang | |
| 2007/0287781 A1 | | 12/2007 | Grass et al. | |
| 2010/0034864 A1 | | 2/2010 | Spedden | |
| 2013/0202788 A1 | | 8/2013 | Mikkelsen et al. | |
| 2013/0302431 A1 | | 11/2013 | Macdonald | |
| 2014/0024754 A1 | | 1/2014 | Becker et al. | |
| 2017/0296996 A1 | | 10/2017 | Wesner et al. | |

FOREIGN PATENT DOCUMENTS

| | | | |
|---|---|---|---|
| CN | 104224923 A | * | 12/2014 |
| CN | 105102531 | | 11/2015 |
| DE | 202009002221 U1 | | 6/2009 |
| EP | 0124808 | | 11/1984 |
| EP | 0328046 | | 8/1989 |
| EP | 1604693 | | 12/2005 |
| JP | 63314276 A | * | 12/1988 |
| JP | 08127690 | | 5/1996 |
| JP | 2004083665 | | 3/2004 |
| JP | 2007326859 | | 12/2007 |
| JP | 2011132385 | | 7/2009 |
| JP | 2013522479 | | 6/2013 |
| JP | 2013531746 | | 8/2013 |
| JP | 2014512342 | | 5/2014 |
| JP | 2015518058 | | 6/2015 |
| WO | 2006052579 | | 5/2006 |
| WO | 2011103479 | | 8/2011 |
| WO | 2011163377 | | 12/2011 |
| WO | 2013123127 | | 8/2013 |
| WO | 2015007263 | | 1/2015 |
| WO | 2015126391 | | 8/2015 |

OTHER PUBLICATIONS 1-page teaching reference for polycaprolactone. Downloaded on Apr. 2, 2024 from Google search.*

Extended European Search Report for European Patent Application No. 19868782.4-1102, dated Jun. 20, 2022, 8 pages.

International search report for dated Jan. 17, 2020, for related PCT application No. PCT/US2019/054562. 6 pages.

* cited by examiner

POLYVINYL CHLORIDE-FREE LIPOPHILIC POLYMER BASED AROMATIZED PLASTISOL

This application is nationalized from International Patent Application No. PCT/US2019/054562, filed Oct. 3, 2019, which claims the benefit of U.S. Provisional Application No. 62/741,425, filed on Oct. 4, 2018. These and all other referenced extrinsic materials are incorporated herein by reference in their entirety. Where a definition or use of a term in a reference that is incorporated by reference is inconsistent or contrary to the definition of that term provided herein, the definition of that term provided herein is deemed to be controlling.

FIELD OF THE INVENTION

This invention relates to polymer compositions for modeling, in particular, to plastisols for modeling with a high content of volatile substances, such as bactericidal, aromatizing substances, flavoring volatiles. The field of application of such plastisol is the production of a model material for children's games, prototyping, modeling of aromatized articles, bactericidal products, products containing repellents or attractants. The examples of such articles include educational toys, stucco moldings, cosmetic applicators, artificial flowers, fish lures, shoe parts, toys for animals, and the like.

BACKGROUND

Plastic materials for modeling and molding are known. Sculptural materials with properties of plastic gels are traditionally referred to as 'clay', although sculpture clay based on polymeric materials usually does not contain aluminosilicate clay minerals or other inorganic fillers. Thixotropic substances are generally added to polymeric plastisol to produce plastic gels with properties similar to those of clay minerals (as described in U.S. Pat. No. 2,753,314). As a result of applying sufficient shear force such a material becomes plastic, but retains the resulting shape when at rest. Such plastic gel can retain the shape and surface relief when heated until completely hardened.

It is known that such polymer products (which are typically based on polyvinyl chloride or PVC), such as artificial leather, imitation wood trim panels, etc. lack the characteristic scent of the corresponding natural material, and often have an unpleasant odor resulting from the use of a plasticizer. In addition, the phthalates commonly used as plasticizers for common PVC-based sculptural material are endocrine disruptors, which disrupt various systems of a human body as a whole and particularly affect fertility. In addition, during hardening of such plastic gels it is necessary to precisely control the temperature during heating, since when heated above 140° C., thermal destruction of PVC begins and the material releases toxic gaseous hydrogen chloride. Such precise temperature control is a significant barrier to scaling of such processes. It should also be appreciated that such a heating step limits the ability to incorporate volatile compounds (such as those associated with scent and/or flavor) into such plastic gels, and limits the duration and intensity of scents and odors incorporated into them.

U.S. Pat. No. 275,331 and all other publications referenced herein are incorporated by reference to the same extent as if each individual publication or patent application were specifically and individually indicated to be incorporated by reference. Where a definition or use of a term in an incorporated reference is inconsistent or contrary to the definition of that term provided herein, the definition of that term provided herein applies and the definition of that term in the reference does not apply.

Patent literature describes various methods for the preparation of polymer compositions containing volatile substances. A method is known for producing plastics containing flavor additives by mixing a plastic with a water-soluble base containing flavoring additives. Such method is used for producing chewing gum (U.S. Pat. No. 5,100,678). In this method, flavor additives are released during chewing and dissolving a water-soluble base in the oral cavity. This method is effective for destructible materials, but has a limited application in case of the flavoring effect without destroying a material is required. Such polymer composition has a low mechanical strength. Modeling material on this base cannot be used where strength, hardness and water resistance inherent to conventional polymers are required.

There are also patents describing volatile polymer compositions based on silicone block-copolymers containing hydrophilic phase (U.S. Pat. No. 5,008,115). The resulting material can effectively retain a flavor and does not prevent its smooth release. Such material exhibits mechanical properties peculiar to low-strength rubbers or strong gels. This limits its application to those fields where low strength and hardness are not critical. Modeling material based on silicone block-copolymers does not allow obtaining a sufficiently strong material.

United States Patent Application Publication No. 2010/0, 196,732 describes the preparation of an aromatized plastic by mixing polymers with porous or fibrous substrates impregnated with aromatic substances or such as natural and synthetic fibers, paper, wood, mammals' hair, etc. In this case a polymer plays the role of a binder as in the known highly filled wood-fiber, cellulose-paper and similar materials with an adhesive binder. The disadvantages of this known method include the impossibility of obtaining a material that does not contain fillers and, as a consequence, a material that retains plasticity of a plastisol.

U.S. Pat. Nos. 4,703,070, 6,838,033, 5,387,622, and 5,387,411 describe the preparation of an aromatized plastic with the use of cross-linked thermosetting polymers. This method does not allow the use of many volatile substances because of their reactivity. Volatile aromatizing agents can undergo various reactions with a hardener of the composition, which results in an unpleasant smell or inhibits the activity thereof. In addition, elastomers, polyorganosiloxanes, a silicone rubber, a polybutadiene rubber and their copolymers do not form strong solid material when combined with essential oils. Thermosetting polymers cannot be used for the production of articles using conventional methods, such as casting and extrusion. Cross-linked polymers do not melt or dissolve, which complicates both the production of articles and their recycling. For the same reason, the production of modeling material in the form of a thermosetting plastisol based on them is impossible.

It is also known the production of aromatized polymeric materials in the form of organogels. As gelling agents, various polymers based on limited-swellable high molecular weight polymers, such as polyamide resins (U.S. Pat. Nos. 4,184,099, 7,160,337), were proposed. Small concentrations of such substances can hold a large volume of essential oil. Such organogels are suitable as a base for preparing transparent lipsticks, for making scented candles or transparent aromatized granules.

U.S. Pat. No. 4,734,278 describes the preparation of an aromatized composition based on thermoplastic elastomer Pebax® 2533 SA 01 manufactured by ATO CHIMIE (Arkema Group). This polymer can retain up to 60% wt. of volatile aromatics. This thermoplastic elastomer has excellent mechanical characteristics and can be easily processed by standard methods of casting or extrusion. However, this polymer cannot provide a plastisol suitable for being used as a model material. Unfortunately, the material has a tacky or sticky surface as a result of material that is formed on mixing with solvents such as volatile aromatics. This results in the contamination of a surface and limits the use of such material to either as part of a mixture with other polymers and fillers or for decorative purposes (where this property is less of an issue). In addition, the taught method utilizes a high processing temperature (180-220° C.), which limits the use of many aromatics having high volatility.

Another approach to producing an aromatized plastisol is found in International Patent Application No. WO 2015/007263, which describes a method in which aromatizing nonpolar substances are used as an additive to known PVC plasticizers of sufficiently high polarity. This method allows the use of only aromatizing "oil" based on plasticizers, which limits the content of aromatics in the resulting material. In addition, hardening of the polyvinyl chloride plastigel is carried out at a considerably high temperature, which limits the use of volatile aromatics with a low boiling point.

One approach to the preparation of a model mass based on polycaprolactone (PCL) disclosed in German Utility Model No. DE 202009002221 U1. The described method attempts to overcome certain drawbacks inherent to PVC-based modeling materials by replacing harmful phthalate plasticizers with metal soaps and fatty acid esters. The utility model, however, is silent in regard to production of aromatized model materials.

Therefore, there is a need for producing a modeling material which does not have the above drawbacks, and which provides the preparation of a strong material with a high content of low-boiling aromatics after hardening. At the same time, according to the latest requirements, it must be waterproof, without sweating out aromatizing agents on the surface and which does not prevent the migration of aromatizing substances, not sticky, containing no toxic or carcinogenic plasticizers, and which does not release toxic substances when heated.

SUMMARY OF THE INVENTION

The following description includes information that may be useful in understanding the present invention. It is not an admission that any of the information provided herein is prior art or relevant to the presently claimed invention, or that any publication specifically or implicitly referenced is prior art.

The object of the invention is to overcome the drawbacks of the prior art and to develop a method for producing a modeling material which, after hardening, provides a strong thermoplastic material with a high content of volatile substances and that is resistant to environmental volatiles under ambient conditions.

This object is achieved by a method preparing a composite material based on a polymer and volatile aromatizing substances that forms a plastisol with the polymer. The polymer is selected to be soluble in organic liquids of different polarities at a temperature above its melting point and insoluble in such solvents at lower temperatures.

The resulting composite differs from conventional organogels in that when the temperature rises above the polymer's melting point the material exhibits properties of an organogel, and when the temperature decreases below the melting point it becomes a rigid polymer matrix retaining organic liquids. In contrast to the conventional gel phase transition peculiar to low molecular weight organic gels or solutions, limited-swellable high-molecular weight compounds of the inventive concept, transition from an organogel into an inert, solvent resistant polymer matrix on cooling.

Compositions of the inventive concept combine the properties of organogels that effectively retain a liquid organic phase (thereby preventing surface "sweating" on heating), and the properties of gels based on cross-linked thermosetting polymers or insoluble limited-swellable block-copolymers that exhibit the strength and chemical resistance of solid gels. The obtained material can advantageously be processed using standard methods for processing thermoplastics, such as casting or extrusion.

Surprisingly, Inventors have found out that a lyophilic polyamide or lyophilic complex polyester polymer (for example, polycaprolactone) that is resistant to solvents in standard conditions at temperatures above its melting point forms an organogel with aromatizing agents of different polarity. In a preferred embodiments the aromatizing agent can be an essential oil of different polarity. Above its melting point, the polymer easily mixes with volatile substances of different polarity. The composite material obtained after hardening preserves the mechanical properties of polycaprolactone while exhibiting a desired odor or aroma. In addition, the resulting composite does not have stickiness inherent to limited-swellable thermoplastic elastomers based on other resins.

Various objects, features, aspects and advantages of the inventive subject matter will become more apparent from the following detailed description of preferred embodiments.

BRIEF DESCRIPTION OF THE DRAWINGS

FIG. 1 schematically depicts a method of the inventive concept for making a plastic mass of the inventive concept. Components are ground and mixed to form a plastisol.

FIG. 2 schematically depicts a method of the inventive concept for generating a solid or rigid product by forming and heating of the plastisol generated as shown in FIG. 1.

DETAILED DESCRIPTION

Figure 1:
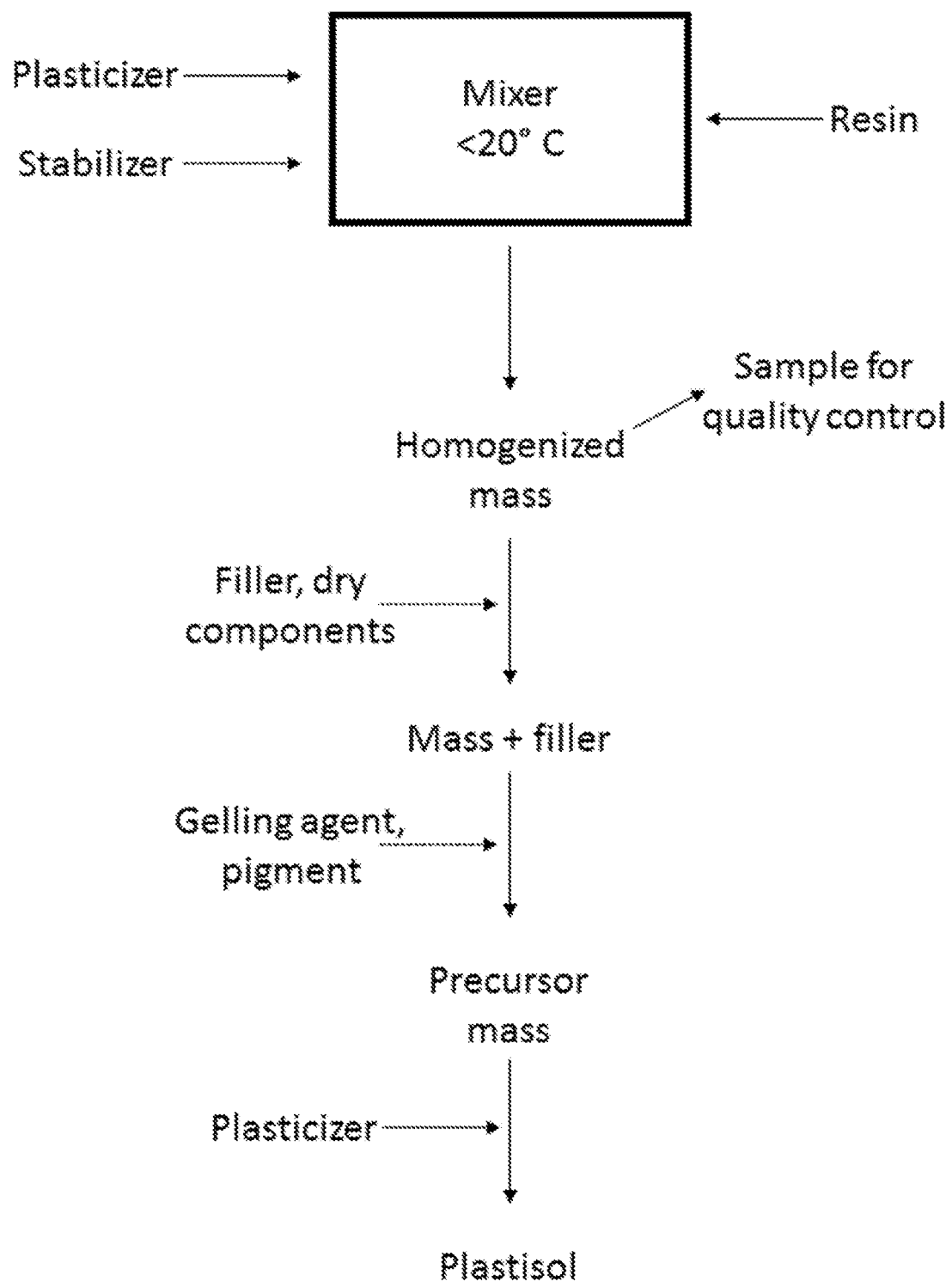
FIG. 1.

In some embodiments, the numbers expressing quantities of ingredients, properties such as concentration, reaction conditions, and so forth, used to describe and claim certain embodiments of the invention are to be understood as being modified in some instances by the term "about." Accordingly, in some embodiments, the numerical parameters set forth in the written description and attached claims are approximations that can vary depending upon the desired properties sought to be obtained by a particular embodiment. In some embodiments, the numerical parameters should be construed in light of the number of reported significant digits and by applying ordinary rounding techniques. Notwithstanding that the numerical ranges and parameters setting forth the broad scope of some embodiments of the invention are approximations, the numerical values set forth in the specific examples are reported as precisely as practicable. The numerical values presented in some embodiments of the invention may contain certain errors necessarily resulting from the standard deviation found in their respective testing measurements.

As used in the description herein and throughout the claims that follow, the meaning of "a," "an," and "the" includes plural reference unless the context clearly dictates otherwise. Also, as used in the description herein, the meaning of "in" includes "in" and "on" unless the context clearly dictates otherwise.

As used herein, and unless the context dictates otherwise, the term "coupled to" is intended to include both direct coupling (in which two elements that are coupled to each other contact each other) and indirect coupling (in which at least one additional element is located between the two elements). Therefore, the terms "coupled to" and "coupled with" are used synonymously.

Unless the context dictates the contrary, all ranges set forth herein should be interpreted as being inclusive of their endpoints, and open-ended ranges should be interpreted to include commercially practical values. Similarly, all lists of values should be considered as inclusive of intermediate values unless the context indicates the contrary.

The recitation of ranges of values herein is merely intended to serve as a shorthand method of referring individually to each separate value falling within the range. Unless otherwise indicated herein, each individual value is incorporated into the specification as if it were individually recited herein. All methods described herein can be performed in any suitable order unless otherwise indicated herein or otherwise clearly contradicted by context. The use of any and all examples, or exemplary language (e.g. "such as") provided with respect to certain embodiments herein is intended merely to better illuminate the invention and does not pose a limitation on the scope of the invention otherwise claimed. No language in the specification should be construed as indicating any non-claimed element essential to the practice of the invention.

Groupings of alternative elements or embodiments of the invention disclosed herein are not to be construed as limitations. Each group member can be referred to and claimed individually or in any combination with other members of the group or other elements found herein. One or more members of a group can be included in, or deleted from, a group for reasons of convenience and/or patentability. When any such inclusion or deletion occurs, the specification is herein deemed to contain the group as modified thus fulfilling the written description of all Markush groups used in the appended claims.

The production of material for molding based on polyvinyl chloride plastigels, nitrocellulose and other polymers that have affinity for polar non-volatile plasticizers is known. Such materials are characterized by high plasticity. As such these materials are easily molded and retain the form thus obtained. The absence of flow at low shear stresses allows the shape of the obtained articles to be retained until they have completely hardened.

Conversely, when heated to a gelatinization temperature a conventional plastisol gelatinizes and as a result solidifies, losing flowability in its whole volume without disturbing the homogeneity of the system. However, liquids of moderate to low polarity have a low affinity for these polymers. Accordingly attempts at plasticization via the use of such liquids of moderate to low polarity leads to undesirable migration of the plasticizer to the surface (i.e. sweating).

Some polymers have a high affinity for organic liquids of moderate to high polarity. Pearce E. M. et al., Contemporary Topics in Polymer Science, Vol. 2, Plenum Press, New York, 1977, page 271) describes the use of polycaprolactone copolymers for drug delivery. Inventors have unexpectedly found out that certain classes of polymer (such as lyophilic polyamides and lyophilic complex polyester polymers, e.g. caprolactone) and substances of moderate to low polarity (e.g. volatile aromatic substances such as essential oils) can be combined to form a stable plastisol without the need for addition of a polar plasticizer (e.g. phthalates). Such a material advantageously does not have the drawbacks inherent with conventional plastisols based on PVC and other polymers. Such lyophilic polyamides and lyophilic complex polyester polymers can be selected to provide a non-toxic, biodegradable material. In a preferred embodiment the lyophilic complex polyester polymer is polycaprolactone. The resulting composite plastisol also does not have the disadvantages of conventional modeling materials based on block polycaprolactone, which require preliminary thermal softening and do not allow production of thin molded articles. A composition obtained by mixing a lyophilic polyamide or lyophilic complex polyester polymer (such as polycaprolactone) powder, a plasticizer and a suitable gelling agent is a self-maintained mass that can be modeled, molded, extruded, stamped and which retains its shape until it is completely hardened.

Compositions of the inventive concept include such a plastisol and can optionally contains additives, where the essential components of the plastisol are a suitable polymer (such as lyophilic polyamide and/or a lyophilic complex polyester polymer, e.g. polycaprolactone) and one or more substances of low to moderate polarity (preferably one or more essential oils). Suitable essential oils can be prepared by distillation of volatile materials and/or extraction of organic-soluble compounds from a natural material (e.g. flower, root, stem, and/or seed portions of plants). Embodiments of the inventive concept further encompass plastics produced from such plastisols as well as articles produced using such plastics.

Production of a plastisol and plastics of the inventive concept can include one or more heating steps. For example, a plastisol of the inventive concept can form a gel and/or a rigid plastic when heated. Accordingly, in preferred embodiments temperature is controlled during mixing steps of plastisol formulation in order to remove at least a portion of the heat generated by mixing. This avoids premature and/or uncontrolled gelatinization of the plastisol before components are thoroughly mixed. When polycaprolactone is used, at 40-50° C. pre-gelatinization begins and intensive absorption of an added essential oil by the polymer takes place. This is manifested by an increase in viscosity. The resulting mixture gelatinizes resulting in complete loss of fluid properties.

Further heating to above the melting point of the polymer component results in the formation of a homogeneous plastic body with uniform distribution of components throughout its entire volume and optimal mechanical properties. On further heating the material loses the plasticity of a gel and attains the strength and hardness of plastic.

In order to provide optimal properties, a composition of the inventive concept can include various additives such as viscosity reducing diluents and thickeners, pigments, odor retaining additives, etc.

To obtain a product capable of retaining shape prior to gelatinization (which may be desirable for some forming processes) it can be necessary to include in the material composition a thickening agent and/or a thixotropic additive to the plastisol mixture. Suitable thickening agents/thixotropic additives include (but are not limited to) salts of fatty acids and polyvalent metals. Specific examples include aluminum distearate (commercially available from Ferro), Norac (an aerogel powder such as LUMIRA®, commercially available from Cabot Corporation), colloidal silicas such as Cab-O-Sil (Cabot) and Aerosil (Degussa), hydrophobizated bentonite, fatty acid esters, etc. Such additives can be introduced in an amount of 2 to 6% by weight of the polymer.

Inventors have found that excessive amounts (e.g. in excess of 6% by weight) of such thickening agents or thixotropic additive can degrade mechanical properties of the plastic material obtained after hardening. The addition of thixotropic additives can be carried out by pre-mixing a plasticizer (i.e. a volatile odorizing agent) with such an additive using mixing equipment that provides a sufficient amount of shear force (e.g. a dissolver, a bead mill, etc.). For producing a transparent material, thixotropic additives that do not inhibit transparency, such as polyacrylic acid (for example Carbopol, through Noveon) or calcium sulfonate, for example available Ircogel 900 from Noveon) can be used.

When a scented article is desired a composition of the inventive concept can include one or more odor fixatives. Suitable odor fixatives include vegetable resinoids (e.g. oak moss resinoid, pistachio resinoid, etc.), macrocyclic musk (e.g. macrocyclic ketones and/or lactones), nitro musk (e.g. nitrobenzene compounds), ambroxide, glucoside polyols (e.g. ethoxylated and/or propoxylated methylglucoside), and similar compounds.

In order to aid in mixing and suspension a plastisol of the inventive concept can be prepared based on a fine powder of spray-dried lyophilic polyamide and/or lyophilic complex polyester polymer (such as polycaprolactone) prepared by dispersion polymerization, as taught in U.S. Pat. No. 3,632,669. It should be appreciated that stability of the plastisol as well as fluidic properties are determined in part by the mean particle size and size distribution of the polymer. Optimal properties for the plastisol are obtained using such a powder with a having polymer particles with a sufficiently large average diameter. Suitable average diameters range from about 0.05 to about 1.5 µm, preferably 0.2 up to 1 µm. Such polymer particles preferably have a spherical form, a wide size distribution, and do not contain a highly dispersed phase. Inventors have found that polymer particles of very small size can dissolve, resulting in an undesirable increase in viscosity.

Inventors have found that some essential oil preparations can have desirable functional properties for the final plastic but product, but can result in excessive swelling of the polymer particles during plastisol formulation. In such cases a diluent with a low thermodynamic affinity for the polymer (such as dipropylene glycol, triacetin, glycerol, citric, adipic and/or benzoic acids esters, and the like) can be added to increase structural plasticization.

A plastisol of then inventive concept can have from 5 to 75% by weight of lyophilic polyamide and/or lyophilic complex polyester polymer (such as polycaprolactone) and from 5% to 85% by weight of a plasticizing substance of moderate to low polarity, preferably a volatile aromatizing agent (e.g. an essential oil). In addition, such a plastisol can include from 0% to 20% by weight of a non-volatile diluent and/or 0% to 10% by weight of a thixotropic stabilizer. Plastisols of the inventive concept can include an inorganic filler at from 0% to 75% by weight of one or more inorganic filler(s), and/or from 0% to 70% (preferably 5% to 70%) by weight of an organic filler (such as ethylene-vinyl acetate copolymer). Plastisols of the inventive concept can also include from 0% to 5% by weight of a pigment, and from 0% to 20% by weight of other additives (such as an odor fixer, a structural additive, a matting additive, and the like).

As noted above inorganic and organic fillers can be incorporated into a plastisol of the inventive concept. For example, kaolin, chalk, talc, aluminum hydroxide, aluminum silicate, silicon dioxide, powdered bentonite, wood flour, jute fiber, and/or a polymer powder can be used as a filler. For example, a polymer powder based on ethylene-vinyl acetate copolymer (EVA) with a high degree of substitution (available under the Evathene brand from the USI Corporation) exhibits can be used as a filler in a plastisol of the inventive concept. In some embodiments a conductive filler (e.g. metal, graphite, or carbon) can be utilized in order to modify electrical conductivity of the final product. In order to obtain a homogeneous material that exhibits sufficiently fine detail it is preferable to use a fiber or powders of a size less than 100 µm, most preferably less than 50 µm.

Lightweight or hollow filler materials can also be used. For example, hollow microspheres such as pumice, hollow glass and ceramic microspheres, and hollow polymer microspheres can be used as light-weight fillers. Suitable examples include fly ash, cenospheres, and/or artificial microspheres commercially available from 3M or Osthoff Petrasch.

As noted above, plastisols of the inventive concept can incorporate pigments in order to provide a desired color. As colorant pigments, insoluble polymer pigments, organic pigments, and/or inorganic powder pigments can be used, including pigments that provide special or unusual effects (e.g. fluorescence, phosphorescence, diffractive effects, etc.). Light-fast pigment varnishes are preferable.

As effect pigments, flake pigments such as "metallic" commercially available from Eckart GmbH & Co. KG. KG, pearlescent pigments commercially available from EMD (Merck KGaA), BASF, CQV, polyester glitters, fluorescent pigments, luminescent pigments, thermo-indicator pigments and the like can be used. Various colored materials can also be added in a random or patterned fashion to produce decorative effects, such as a marble effect, a mosaic effect (millefiori), and the like.

As noted above, when a solid plastic material having an enduring scent or odor is desired the moderate to low polarity plasticizer can be or include an essential oil. Essential oils are volatile, hydrophobic substances prepared from natural sources, and are typically strongly scented. They can be prepared by direct distillation of oily materials from plant or other products, or by extraction of scented compounds from plant material or other natural materials using various solvents. On their own such essential oils quickly evaporate and dissipate, so unless constantly renewed the scent is quickly lost. Surprisingly, Inventors have found that when an essential oil is utilized as a plasticizing agent in a composition of the inventive concept the resulting plastic solid retains the scent of the essential oil used for an extended period of time. Typically, a plastic solid so prepared can retain the scent of the essential oil for at least a month, two months, six months, one year, two years, five years, or more than five years of open storage under ambient conditions, without the need for replenishment and/or renewal. In some embodiments an essential oil can be used as extracted or distilled. In other embodiments the essential oil can be diluted in a carrier solvent of moderate to low priority. In some embodiments more than one essential oil can be used in the formulation of a scented plastic solid in order to reproduce more complex scents or scent combinations. In some embodiments of the inventive concept one or more essential oils can be provided that provide the plastisol with a flavor, which can be in place of or in addition to a scent.

It should be appreciated that, while preferred embodiments of the inventive concept incorporate essential oils that confer odor and/or flavor, other compounds that can be provided as low to moderate polarity solvents or as solutions in same can be incorporated into plastisols of the inventive concept in order to provide them with desirable characteristics. Other moderate to low polarity plasticizers can, for example, incorporate deodorant compounds, insect/pest repellant compounds, anti-fouling compounds, antiseptic compounds, antiviral compounds, and/or antibiotic compounds. The characteristics of such plasticizers are imputed to the plastisol so produced. Accordingly, plastisols of the inventive concept have a wide range of applications ranging from clothing, work surfaces, health care, biomedical devices, and marine transportation.

Plastisols of the inventive concept can be provided in a variety of forms, such as a solid, a fiber, a powder, a viscous plastisol, and/or a liquid dispersion or additive utilized in other polymeric materials. As such a plastisol of the inventive concept can be processed or shaped using a variety of methods ways, including spraying, extrusion, calandering, press molding, pressing, stamping, and/or blowing (for example, into a mold).

Accordingly, plastisols of the inventive concept can be provided in a variety of forms or geometries. For example, such a plastisol can be provided as a modeling clay, a molded article, such as granules, blanks, and/or finished articles. Plastisols of the inventive concept can also be extruded as threads or fibers, or cast as films or sheets. Similarly, a plastisol of the inventive concept can be applied as a coating or an ink, for example as a coating of an aromatized plastisol film on an object, on fibers or textiles, and/or on porous materials.

Depending upon the form in which the plastisol is cast and on the content of the low to moderate polarity plasticizer, a wide variety of functional articles can be produced using plastisols of the inventive concept. Incorporation of essential oils as plasticizers provides for incorporation of scent and/or flavors into such articles. Examples of cast or molded articles into which scent and/or flavor can be incorporated include decorative items, children's toys, pet toys, hunting or fishing lures, and scent delivery systems. Such properties can similarly be provided by plastisol ink embodiments of the inventive concept (which can be applied to an article's surface, followed by curing), and in some embodiments can be incorporated into materials utilized in 3D printing.

Incorporation of antimicrobial compounds into plasticizers used in plastisols of the inventive concept can confer anti-bacterial and/or anti-viral properties onto a variety of household items. When formed as a fiber, such plastisols can be woven into fabrics suitable for medical use as protective clothing, draping, and dressings. When cast or molded such plastisols can be used to provide antimicrobial surfaces (e.g. changing tables, cutting boards) or medical devices (e.g. splints, orthotics, surgical instruments, etc.). Similarly, such antimicrobial surfaces can be generated by application of a plastisol of the inventive concept that incorporates an anti-bacterial and/or anti-viral agent and that is applied as a film, spray, or ink, followed by curing.

Incorporation of anti-fouling compounds or other compounds that discourage attachment of marine life into plasticizers used in the production of plastisols of the inventive concept can provide anti-fouling coatings (e.g. by suspension of particulates of the plastisol), films, and sheets that can be applied to the exposed surfaces of marine vessels in order to prevent unwanted attachment and growth of marine life. Similarly, pest-repelling essential oils or compounds can be used to produce plastisols that, when formed as fibers, can in turn be used to provide clothing and similar articles for outdoor wear. Such pest repellency can also be provided by application of such a plastisol to a clothing article as a spray or ink, followed by curing.

FIG. 1 shows a typical process for producing a plastisol the inventive concept that is suitable for forming (e.g. molding, extrusion, calandering, etc.). Initially, a lyophilic polyamide resin and/or a lyophilic complex polyester polymer resin (preferably in particulate form) and a portion of low to moderate polarity plasticizer (such as an essential oil) are blended in a cooled mixer or ball mill to form a suspension of the polymer resin in the plasticizer. Optionally, a stabilizer can be added at this stage. Once these components are blended and homogenous a portion can be taken for quality control testing. Additional materials, such as fillers and other dry components, can be blended in following this initial mixing, followed by the addition of. other components, such as gelling agents, pigments, etc. The remaining plasticizer can then be blended in to form a plastisol that is sufficiently fluid for the chosen forming process.

Once formed, such a plastisol can be utilized immediately or stored for future use. Storage should be at ambient or lower temperatures in order to prevent or reduce gelation. It should be appreciated that the particle size and size distribution of the initial polymer raw material can impact storage stability, with very large particles settling quickly and very small particles being prone to solvation. In some embodiments (such as printing inks, modeling clays, etc.) the plastisol can be the final product provided to a consumer, with heating to form a stable plastic solid performed by the consumer (e.g. through heat curing of a printed fabric or other surface).

Figure 2:
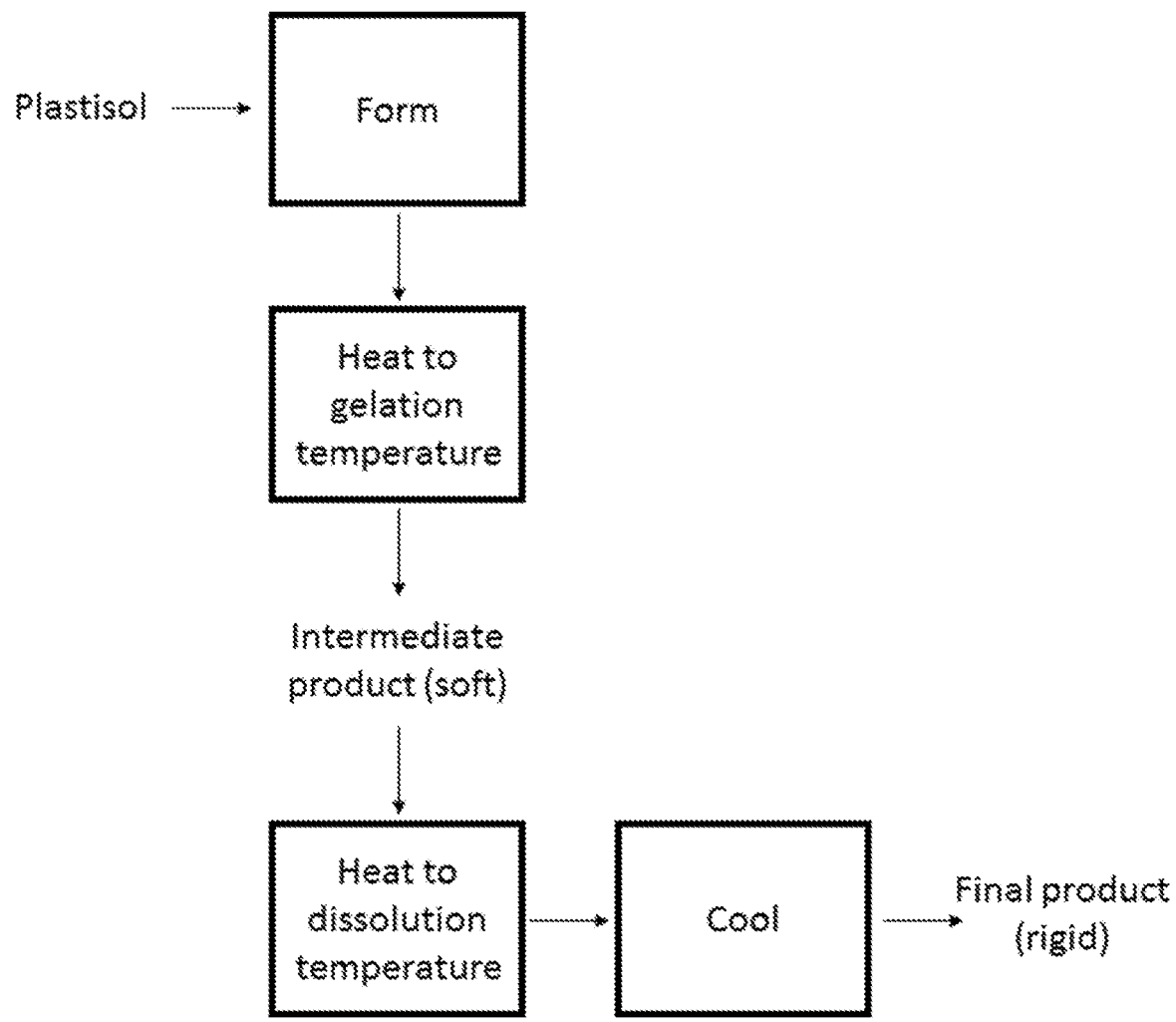
FIG. 2.

FIG. 2 shows a typical process for forming a plastic solid product of the inventive concept. A plastisol produced as shown in FIG. 1 has sufficient fluidity for forming. The material can be formed by any suitable process, including molding, casting, blowing, extruding, and/or calandering. After forming the material is heated to a its gelation temperature, resulting in the formation of an intermediate product that is soft and/or pliable. In some embodiments this property can be utilized to remove the intermediate product from a mold with minimal damage. The intermediate product is then heated to a dissolution temperature at which at least a portion of the lyophilic polyamide resin and/or a lyophilic complex polyester polymer resin dissolves in at least a portion of the low to moderate polarity plasticizer, and then cooled to form a stable, solid final product. Surprisingly, Inventors have found that compositions of the inventive concept to not 'sweat' or release plasticizer to the surface of the final plastic product, and exhibit properties of the plasticizer (e.g. scent, flavor, antimicrobial, etc.) for extended periods of time.

In some embodiments a gelatinous product resulting from raising a plastisol of the inventive concept to above its gelatinization temperature can be the final product, or an intermediate product that is purchased for additional processing by a consumer (e.g. additional cutting and/or shaping). In other embodiments a solid, relatively rigid plastic article or material prepared from a plastisol of the inventive concept can be the final product.

Examples

Suitable polycaprolactone particles of the invention can be produced in accordance with the method disclosed in U.S. Pat. No. 3,632,669. The resulting spray-dried powder is mixed with the fillers and pigments, a portion of a plasticizing aromatic substance (e.g. an essential oil) and then a remaining aromatic plasticizer pre-mixed with thixotropic gelling agents are added. The obtained mass can be molded into blocks or sheets.

Sufficient shear forces are needed for dispersing components of the plastisol. At the same time, the duration of cycles and shear velocity need to be controlled to prevent generation of excessive heat that could prematurely induce the gelatinization reaction. It is desirable to maintain a temperature below 20° C. (e.g. by using a cooling jacket, short mixing cycles, and/or limiting the mixing rate). A composition in which viscosity is reduced with the concomitant increase in shear velocity can be efficiently prepared at higher velocities. However, this can result in severe restrictions on cycle time. To address this issue thixotropic substances and pigments that require very high shear forces for dispersion can be added separately, in the form of a finished paste.

A planetary mixer can be used to prepare a homogenous plastisol of high and moderate viscosity. Planetary mixers (such as HV Blades, available from Charles Ross & Son) can be used to provide a plastisol having a viscosity up to six million centipoises. Such a planetary mixer can be equipped with a solvent-regeneration unit, enclosed motor and evaporation-controlling means.

The mixer is typically charged with 60-80% of the total amount of a plasticizer (e.g. e.g. moderate to low polarity aromatics). After starting cooling (e.g. by initiating a flow of water through the mixer's cooling jacket) and turning on the agitator, the plastic or resin is rapidly introduced and distributed. Stabilizers can be added if necessary. The composition is agitated until homogenization of the introduced material is achieved. At this point it is possible to take a sample for quality control. In some embodiments additional components (such as a filler and/or other dry components) can then be added. After introducing the fillers, a dispersion of gelling agents and a pigment paste can be added. After this additional plasticizer (e.g. moderate to low polarity aromatics, diluents, etc.) can be introduced.

As noted above, the obtained plastisol can be processed by means of extrusion, milling, or calendaring into briquettes or sheets useful for producing articles by means of modeling, stamping, and/or molding.

The produced articles are hardened by solvation of the plastic or resin (e.g. a lyophilic polyamide or lyophilic complex polyester) with a plasticizer to form a plastisol. This can be accomplished by heating. Various heating methods can be used for this purpose, such as convective heating, radiation heating (e.g. infrared or IR heating), and/or or immersion in a heated liquid. IR irradiation is preferable as it reduces or prevents the emission of volatiles that can occur during the circulation of hot air and/or during the immersion in hot liquids.

Formulations

Modeling Mass Based on Bactericidal Volatile Substances:
  poly-ε-caprolactone (PCL) powder—20% wt.
    aerogel powder (LUMIRA®, Cabot Corporation)—10% wt.
    terpinene-4-ol—30% wt.
    carvacrol—20% wt.
    pachulol—10% wt.
    resinate of oak moss—10% wt.

Modeling Mass Based on a Persistent Flavoring Agent with a Strong Odor:
  PCL powder—60% wt.
    aerogel powder (LUMIRA®, Cabot Corporation)—4% wt.
    1-muscone (Takasago corp.)—30% wt.
    thesaron (Takasago corp.)—10% wt.

Dyed Modeling Mass:
  PCL powder—20% wt.
    EVA powder (Evathene, USI Corporation)—25% wt.
    aerogel powder (LUMIRA®, Cabot Corporation)—4% wt.
    calcium sulfonate (Ircogel 900 from Noveon)—1
    pigment lava red (Merck KGaA)—5% wt.
    thesaron (Takasago corp.)—45% wt.

Modeling Mass Based on Non-Persistent Aromatic Substance with High Volatility:
  PCL powder—30% wt.
    EVA powder (Evathene, USI Corporation)—10% wt.
    aluminum distearate—4% wt.
    resinate of oak moss—15% wt.
    propoxylated methyl glucoside—1% wt.
    essential oil of orange flowers—40% wt.

Dyed Modeling Mass with a "Cappuccino" Odor:
  PCL powder—75% wt.
    aerogel powder (LUMIRA®, Cabot Corporation)—1% wt.
    coffee essential oil (steam extract)—5% wt.
    cinnamon essential oil (steam extract)—0.5% wt.
    glycerol—2.5% wt.
    oak moss rubber—6% wt.
    pigment mars brown—10% wt.

Modeling Mass Based Mixture of Lyophilic Complex Polyester Polymers and Ester-Terminated Polyamide
  PCL powder—25% wt.
    polyamide UNICLEAR™ 100 powder (Arizona Chemical Company)—25% wt.
    aluminum distearate—4% wt.
    resinate of oak moss—5% wt.
    propoxylated methyl glucoside—1% wt.
    neroli essential (oil of pomerans flowers)—40% wt.

It should be apparent to those skilled in the art that many more modifications besides those already described are possible without departing from the inventive concepts herein. The inventive subject matter, therefore, is not to be restricted except in the scope of the appended claims. Moreover, in interpreting both the specification and the claims, all terms should be interpreted in the broadest possible manner consistent with the context. In particular, the terms "comprises" and "comprising" should be interpreted as referring to elements, components, or steps in a non-exclusive manner, indicating that the referenced elements, components, or steps may be present, or utilized, or combined with other elements, components, or steps that are not expressly referenced. Where the specification claims refer to at least one of something selected from the group consisting of A, B, C . . . and N, the text should be interpreted as requiring only one element from the group, not A plus N, or B plus N, etc.

What is claimed is:

1. A plastisol comprising polycaprolactone, a diluent with a low thermodynamic affinity for the polycaprolactone, a plasticizer, wherein the plasticizer comprises an essential oil or a volatile antibacterial agent, and a synthetic fibrous material or cellulose fibers.

2. A plastisol comprising polycaprolactone, a diluent with a low thermodynamic affinity for the polycaprolactone, a plasticizer, wherein the plasticizer comprises an essential oil or a volatile antibacterial agent, and a filler.

3. A method of manufacturing a plastisol, comprising:
obtaining a lyophilic polyamide or a lyophilic complex polyester; and
blending the lyophilic polyamide or the lyophilic complex polyester with a plasticizer and a diluent with a low thermodynamic affinity for the lyophilic polyamide or the lyophilic complex polyester to generate the plastisol, wherein the plastisol comprises from 5 to 75% wt. of the lyophilic polyamide or the lyophilic complex polyester and from 5 to 85% wt. of the plasticizer, wherein the plasticizer comprises an essential oil or a volatile antibacterial agent, and wherein the diluent is selected from the group consisting of dipropylene glycol, triacetin, glycerol, citric, adipic and benzoic acids esters.

4. The method of claim 3, wherein the plasticizer is an essential oil.

5. The method of claim 3, wherein the plasticizer is an antimicrobial.

6. The method of claim 3, further comprising blending a thixotropic additive with the lyophilic polyamide or the lyophilic complex polyester.

7. The method of claim 3, further comprising blending a filler with the lyophilic polyamide or the lyophilic complex polyester.

8. The method of claim 3, further comprising blending a pigment with the lyophilic polyamide or the lyophilic complex polyester.

9. The plastisol of claim 3, wherein the plastisol comprises about 60% wt. of the lyophilic polyamide or lyophilic complex polyester.

10. A plastisol comprising polycaprolactone, a diluent with a low thermodynamic affinity for the polycaprolactone, and a plasticizer, wherein the plasticizer comprises an essential oil or a volatile antibacterial agent, and wherein the plastisol comprises about 60% wt. of the polycaprolactone.

* * * * *